UNITED STATES PATENT OFFICE.

WILLIAM J. CHRYSTAL, OF GLASGOW, COUNTY OF LANARK, SCOTLAND.

MANUFACTURE OF CHROMATES AND BICHROMATES.

SPECIFICATION forming part of Letters Patent No. 329,138, dated October 27, 1885.

Application filed April 22, 1885. Serial No. 163,061. (No specimens.) Patented in England April 7, 1885, No. 4,290.

*To all whom it may concern:*

Be it known that I, WILLIAM JAMES CHRYSTAL, residing at Glasgow, in the county of Lanark, Scotland, and a subject of the Queen of Great Britain and Ireland, have invented Improvements in the Manufacture of Chromates and Bichromates, of which the following is a specification.

My invention has for its object the successful manufacture of chromates and bichromates of potash and ammonia from the chromate or bichromate of soda.

I take a solution of chromate or bichromate of soda and decompose it, either hot or cold, with sulphate of potash or sulphate of ammonia, either in the solid form or in solution, by direct action, according to the equations:

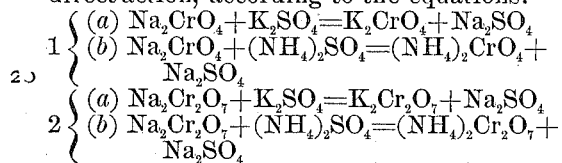

Equations 1 result in the production of (*a*) chromate of potash and sulphate of soda, and (*b*) chromate of ammonia and sulphate of soda. These chromates I separate from the sulphate of soda either by concentration and salting or by crystallization. The chromate of potash or the chromate of ammonia so produced may be converted into the corresponding bichromate by the well-known method—namely, by addition of a suitable acid.

Equations 2 result in the production of (*a*) bichromate of potash and sulphate of soda, and (*b*) bichromate of ammonia and sulphate of soda. These bichromates I separate from the sulphate of soda either by concentration and salting or by crystallization.

The above equations represent equivalent quantities. In practice, however, the quantities may be varied, either more or less sulphate of potash or sulphate of ammonia being used.

What I claim is—

1. The process herein described for the manufacture of alkaline chromates, said process consisting in decomposing chromate of soda with an alkaline sulphate and separating the alkaline chromate, as set forth.

2. The process herein described for the manufacture of alkaline bichromates, said process consisting in first decomposing chromate of soda with an alkaline sulphate, separating the sulphate of soda, and converting the alkaline chromate into a bichromate by adding a suitable acid, as set forth.

3. The process herein described for the manufacture of alkaline bichromates, said process consisting in decomposing bichromate of soda with an alkaline sulphate and separating the alkaline bichromate, as set forth.

In testimony whereof I have signed my name to this specification in the presence of two subscribing witnesses.

W. J. CHRYSTAL.

Witnesses:
 WALLACE FAIRWEATHER,
 JAMES B. PAUL.